US009816755B2

(12) United States Patent
Beasse et al.

(10) Patent No.: US 9,816,755 B2
(45) Date of Patent: Nov. 14, 2017

(54) PROCESS AND APPARATUS FOR SEPARATING $NO_2$ FROM A $CO_2$ AND $NO_2$-CONTAINING FLUID

(71) Applicant: L'Air Liquide, Societe Anonyme pour l'Etude et l'Exploitation des Procedes Georges Claude, Paris (FR)

(72) Inventors: Gregoire Beasse, Paris (FR); Sudhir S. Kulkarni, Wilmington, DE (US); Madhava R. Kosuri, Newark, DE (US); Matthieu Leclerc, Paris (FR); Claire Bourhy-Weber, Suresnes (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 15/198,677

(22) Filed: Jun. 30, 2016

(65) Prior Publication Data
US 2016/0313058 A1    Oct. 27, 2016

Related U.S. Application Data

(62) Division of application No. 14/265,710, filed on Apr. 30, 2014, now Pat. No. 9,458,022.
(Continued)

(51) Int. Cl.
*B01D 53/22* (2006.01)
*F25J 3/02* (2006.01)
(Continued)

(52) U.S. Cl.
CPC .............. *F25J 3/0266* (2013.01); *B01D 3/00* (2013.01); *B01D 3/145* (2013.01);
(Continued)

(58) Field of Classification Search
CPC ................ B01D 19/0031; B01D 71/48; B01D 2259/4516; B01D 71/52; B01D 53/228;
(Continued)

(56) References Cited

U.S. PATENT DOCUMENTS 3,903,694 A * 9/1975 Aine ....................... B01D 53/22
                                                    423/212
4,001,279 A * 1/1977 Cram .................... C07D 273/00
                                                    540/469
(Continued)

OTHER PUBLICATIONS

International Search Report and Written Opinion for PCT/US2015/022999, dated Jul. 8, 2015.

*Primary Examiner* — Anthony Shumate
(74) *Attorney, Agent, or Firm* — Christopher J. Cronin

(57) ABSTRACT

A process for separating carbon dioxide from a fluid containing carbon dioxide, $NO_2$, and at least one of oxygen, argon, and nitrogen comprises the steps of separating at least part of the fluid into a carbon dioxide enriched stream, a carbon dioxide depleted stream comprising $CO_2$ and at least one of oxygen, argon, and nitrogen and a $NO_2$ enriched stream and recycling said $NO_2$ enriched stream upstream of the separation step.

9 Claims, 3 Drawing Sheets

Related U.S. Application Data

(60) Provisional application No. 61/971,840, filed on Mar. 28, 2014.

(51) Int. Cl.

| | | |
|---|---|---|
| *B01D 53/00* | (2006.01) | |
| *C01B 31/20* | (2006.01) | |
| *B01D 3/00* | (2006.01) | |
| *B01D 3/14* | (2006.01) | |
| *B01D 19/00* | (2006.01) | |
| *B01D 61/36* | (2006.01) | |
| *B01D 71/48* | (2006.01) | |
| *B01D 71/52* | (2006.01) | |
| *B01D 71/56* | (2006.01) | |
| *B01D 71/70* | (2006.01) | |
| *B01D 71/80* | (2006.01) | |

(52) U.S. Cl.
CPC ....... *B01D 19/0031* (2013.01); *B01D 53/002* (2013.01); *B01D 53/22* (2013.01); *B01D 61/362* (2013.01); *C01B 31/20* (2013.01); B01D 53/228 (2013.01); B01D 71/48 (2013.01); B01D 71/52 (2013.01); B01D 71/56 (2013.01); B01D 71/70 (2013.01); B01D 71/80 (2013.01); B01D 2256/22 (2013.01); B01D 2257/404 (2013.01); B01D 2259/4516 (2013.01); B01D 2311/04 (2013.01); B01D 2311/08 (2013.01); B01D 2311/13 (2013.01); B01D 2311/2669 (2013.01); B01D 2323/30 (2013.01); F25J 2200/02 (2013.01); F25J 2200/04 (2013.01); F25J 2200/40 (2013.01); F25J 2200/70 (2013.01); F25J 2205/02 (2013.01); F25J 2205/30 (2013.01); F25J 2205/40 (2013.01); F25J 2205/80 (2013.01); F25J 2210/04 (2013.01); F25J 2210/70 (2013.01); F25J 2215/80 (2013.01); F25J 2220/82 (2013.01); F25J 2220/84 (2013.01); F25J 2230/30 (2013.01); F25J 2230/80 (2013.01); F25J 2235/80 (2013.01); F25J 2245/02 (2013.01); F25J 2270/02 (2013.01); F25J 2270/04 (2013.01); Y02C 10/12 (2013.01); Y02P 20/145 (2015.11); Y02P 20/152 (2015.11); Y02P 70/34 (2015.11)

(58) Field of Classification Search
CPC .... B01D 71/56; B01D 3/145; B01D 2311/04; B01D 2257/404; B01D 2323/30; B01D 2311/13; B01D 3/00; B01D 53/22; B01D 71/70; B01D 2311/08; B01D 61/362; B01D 2256/22; B01D 71/80; B01D 2311/2669; B01D 53/002; F25J 2200/04; F25J 2200/40; F25J 3/0266; F25J 2200/02; F25J 2205/02; F25J 2220/82; F25J 2230/80; F25J 2270/02; F25J 2220/84; F25J 2270/04; Y02P 70/34; Y02P 20/152; Y02P 20/145; C01B 31/20
See application file for complete search history.

(56) References Cited

U.S. PATENT DOCUMENTS

| | | | | |
|---|---|---|---|---|
| 4,272,437 | A * | 6/1981 | Menard | A61K 31/12 540/201 |
| 4,425,313 | A * | 1/1984 | Cooper | B01D 53/501 423/235 |
| 4,453,026 | A * | 6/1984 | Tahara | C07C 29/80 560/204 |
| 4,717,406 | A | 1/1988 | Giacobbe | |
| 4,963,165 | A | 10/1990 | Blume et al. | |
| 5,080,698 | A * | 1/1992 | Krizan | B01D 71/52 521/180 |
| 5,352,272 | A * | 10/1994 | Moll | B01D 53/22 96/14 |
| 5,607,557 | A | 3/1997 | Streicher | |
| 6,257,018 | B1 * | 7/2001 | Kelly | B01D 5/0054 62/617 |
| 6,843,829 | B2 | 1/2005 | Simmons | |
| 6,860,920 | B2 | 3/2005 | Simmons | |
| 7,708,804 | B2 | 5/2010 | Darde et al. | |
| 8,080,090 | B2 | 12/2011 | Ha | |
| 2008/0173585 | A1 * | 7/2008 | White | B01D 53/002 210/656 |
| 2008/0176174 | A1 * | 7/2008 | White | B01D 53/002 431/5 |
| 2008/0250715 | A1 * | 10/2008 | Cooper | B01D 47/06 48/197 FM |
| 2011/0226605 | A1 * | 9/2011 | Thiers | B01D 1/305 203/10 |
| 2011/0247360 | A1 * | 10/2011 | Hasse | F25J 3/067 62/606 |
| 2012/0144860 | A1 | 6/2012 | Baldauf et al. | |
| 2015/0114033 | A1 * | 4/2015 | Higginbotham | B01D 53/002 62/617 |
| 2015/0273406 | A1 * | 10/2015 | Kulkarni | B01D 71/70 95/46 |
| 2015/0276309 | A1 * | 10/2015 | Beasse | B01D 53/002 62/617 |
| 2016/0045841 | A1 * | 2/2016 | Kaplan | B01J 19/0093 429/49 |
| 2016/0045875 | A1 * | 2/2016 | Butt | B01F 3/04262 435/2 |
| 2016/0340208 | A1 * | 11/2016 | Govindan | C02F 1/08 |

* cited by examiner

PROCESS AND APPARATUS FOR SEPARATING NO$_2$ FROM A CO$_2$ AND NO$_2$-CONTAINING FLUID

CROSS-REFERENCE TO RELATED APPLICATIONS

The present application is a divisional application of U.S. application Ser. No. 14/265,710, filed Apr. 30, 2014, which claims the benefit of priority under 35 U.S.C. §119 (e) to U.S. Provisional Patent Application No. 61/971,840, filed Mar. 28, 2014, the entire contents of which are incorporated herein by reference.

BACKGROUND

Field of the Invention

The present invention relates to a process and apparatus for the separation of gaseous mixture containing carbon dioxide as main component. It relates in particular to processes and apparatus for purifying carbon dioxide, for example coming from combustion of a carbon containing fuel, such as takes place in an oxycombustion fossil fuel or biomass power plant.

Related Art

The combustion of carbon containing fuels produces CO$_2$ and gases such as SO$_2$, SO$_3$, and NOx which pollute the atmosphere and which are major contributors to the greenhouse effect—especially CO$_2$. These CO$_2$ emissions are concentrated in four main sectors: power generation, industrial processes, transportation, and residential or commercial buildings. Most of the emissions of CO$_2$ to the atmosphere from the electricity generation and industrial sectors are currently in the form of flue gas from combustion, in which the CO$_2$ concentration is typically 4-14% by volume for air-fired combustion or up to 60-70% by volume for oxy-combustion, although CO$_2$ is produced at high concentrations by a few industrial processes.

In principle, the flue gas could be purified and stored in which case it would have to be compressed to a pressure of typically more than 100 bar abs, a pressure that would consume an excessive amount of energy. Systems for recovering and purifying CO$_2$ from flue gas are sometimes referred to as CO$_2$ purification units or CPUs. For these reasons it is preferable to produce relatively high purity stream of CO$_2$ for transport, onsite consumption, or storage. This carbon dioxide could be used for enhanced oil recovery or just injected in depleted gas and oil fields or in aquifers.

Among the numerous issues that CO$_2$ capture faces today, the purity of CO$_2$ sent to sub-surface storage (EOR or geological sequestration) is one of the more delicate to address. This is due to the huge difficulties to clearly understand and model the interactions between sub-surface elements and injected gases as well as piping corrosion.

One type of acidic gas commonly found in CO$_2$ captured from flue gas is NOx. By NOx, we mean one or more of oxides of nitrogen, including NO, N$_2$O, N$_2$O$_4$, and NO$_2$ and N$_2$O$_3$. Below 158° C., NO$_2$ is in equilibrium with its polymer/dimer N$_2$O$_4$ where the lower the temperature, the higher the concentration of N$_2$O$_4$ is compared to NO$_2$. In this document, the word NO$_2$ is used to mean not only NO$_2$ but also its polymer/dimer N$_2$O$_4$ in equilibrium.

NOx compounds are not necessarily removed in the CPU process. Some applications, however, require NOx-free CO$_2$.

Some have proposed removal of NOx from flue gas using a De-NOx column through separation of NO$_2$ from CO$_2$ as the critical temperature of NO$_2$ is higher than that of CO$_2$. The use of a De-NOx column still presents the challenge of dealing with the NO$_2$-enriched fluid of the liquid bottom. For example, U.S. Pat. No. 7,708,804 proposes the use of De-NOx column where the NO$_2$-enriched liquid from the bottom of the De-NOx column is dealt with in one of three ways. First, it may be recycled to the inlet of the compressor. Second, it may be sent to a wash column. Third, it may be burned at the burner associated with a boiler (which may itself be the source of the flue gas) in an attempt to reduce the NO$_2$ to N$_2$.

With regard to the first technique, recycling the NO$_2$-enriched fluid to the inlet of the compressor is disadvantageous. Because the recycle stream may represent about 5-10% of the total flow compressed and treated downstream of the compressor, the compressor and downstream equipment must be sized 5-10% larger than it would have to be if the NO$_2$-enriched stream was otherwise not recycled. There would also be a 5% to 10% increase in the required compression energy. Furthermore, the relatively higher acid gas content of the flue gas being compressed will produce a greater amount of acid gas condensate in the compressors. Therefore the compressors and driers will be subjected to a more severe acidic attack in comparison to the absence of a NO$_2$ recycle stream. This more acidic attack may lead to a decreased useful lifetime for the compressors or require the compressor to be constructed of a more costly material that is sufficiently resistant to such acid fluids. Similar negative impacts upon the driers would be expected to occur due to the presence of the acid gas. Finally, in order to decrease the amount of NO2 being recycled to the compressor, the reflux liquid flow rate to the De-NOx column may be decreased. However, a decrease in the reflux liquid flow rate to the De-NOx column may soon cause the column to exceed its wettability limit. This will lead to unsatisfactory decreases in distillation efficiency.

Therefore, it is one object of the invention to provide a method and system of CO$_2$ purification from flue gas that does not require the recycling of a NO$_2$-enriched fluid to a point upstream in the purification process.

With regard to the second technique, use of a wash column would result in significant CO2 losses in case the washed stream is not recycled at the CPU inlet. If the washed stream is instead recycled the at CPU inlet, significant CO$_2$ losses may be avoided. However, this suffers the same above drawback of increasing the size of the compressor and downstream equipment to accommodate the increased flow rate.

Therefore, it is another object of the invention to provide a method and system of CO$_2$ purification from flue gas that does not require the use of a wash column for removal of NO$_2$ from the bottom of a De-NOx column.

With regard to the third technique, reduction of NO$_2$ in the flame of a burner on the scale of a NO$_2$-enriched stream from a De-NOx column presents a very technically challenging problem. Regardless of the relative state of development for such an approach, reduction of NOx in the burner flame still results in significant CO$_2$ losses.

Thus, it is an object of the invention to provide a more reliable way to produce a CO$_2$ product from purification of flue gas that contains a satisfactorily low amount of NOx.

SUMMARY OF THE INVENTION

There is disclosed a process for separating NO$_2$ from a CO$_2$ and NO$_2$-containing fluid. The process comprises the following steps. The fluid comprising CO$_2$, NO$_2$, and at least one of oxygen, argon, and nitrogen is fed to a rectifying distillation column. A first gaseous stream is withdrawn from the rectifying column that is enriched in $CO_2$ and deficient in $NO_2$ relative to the fluid comprising $CO_2$, $NO_2$, and at least one of oxygen, argon, and nitrogen. A liquid stream is withdrawn from the rectifying column that is enriched in $NO_2$ relative to the fluid comprising $CO_2$, $NO_2$, and at least one of oxygen, argon, and nitrogen. The $NO_2$-enriched liquid stream is fed to a fluid separation membrane. A second gaseous stream comprising a permeate gas is withdrawn from the membrane that is enriched in $NO_2$ and deficient in $CO_2$ relative to the liquid stream fed to the membrane. A non-permeate liquid stream is withdrawn from the membrane that is deficient in $NO_2$ and enriched in $CO_2$ relative to the liquid stream fed to the membrane. The non-permeate liquid stream is recycled to the rectifying column.

There is also disclosed an apparatus for separating $NO_2$ from a $CO_2$ and $NO_2$-containing fluid, comprising: a source of a fluid comprising $NO_2$ and $CO_2$; a rectifying distillation column receiving the source fluid; a fluid separation membrane that receives a liquid stream from the rectifying column and yields a liquid non-permeate stream and a gaseous permeate stream; and a pump feeding, to the rectifying column, the non-permeate liquid from the membrane.

Either or both of the process and apparatus may include one or more of the following aspects:

- the fluid comprising $CO_2$, $NO_2$, and at least one of oxygen, argon, and nitrogen is produced by compressing flue gas at a compressor followed by drying and at least partial condensation of the compressed flue gas at a heat exchanger.
- the first gaseous stream is at least partially condensed at a heat exchanger; the at least partially condensed stream is separated at a phase separator to produce a third gaseous stream enriched in at least one of oxygen, argon and nitrogen relative to the first gaseous stream and a liquid stream enriched in $CO_2$ relative to the first gaseous stream; the liquid stream enriched in $CO_2$ is fed to a stripping column; a fourth gaseous stream withdrawn from the stripping column is fed to a suction inlet of the compressor; and a liquid product $CO_2$ stream is withdrawn from the stripping column.
- the liquid product $CO_2$ stream is expanded to provide a biphasic product $CO_2$ stream; any liquid component in the biphasic product $CO_2$ stream is vaporized at a heat exchanger to provide a wholly gaseous product $CO_2$ stream; and the wholly gaseous product $CO_2$ stream us compressed and heated to provide a supercritical product $CO_2$ stream.
- a sweep gas is fed to the fluid separation membrane, wherein the second gaseous stream further comprises the sweep gas.
- the second gaseous stream is fed to a wash column to dissolve at least some of the $NO_2$ present in the second gaseous stream and form nitric acid.
- a fuel is combusted with an oxidant in a boiler to produce the fuel gas, wherein the flue gas has a $NO_x$ content greater than 300 ppm.
- a separation layer of the fluid separation membrane comprises a material selected from the group consisting of: a cross-linked polysiloxane copolyether, polyurethane-polyether block copolymer, a poly(urea)-poly(ether) block copolymer, a poly(ester)-poly(ether) block copolymer, and a poly(amide)-poly(ether) block copolymer.
- a heat exchanger at least partially condenses a gaseous stream from the rectifying column; a phase separator receives the at least partially condensed stream from the heat exchanger and produces a gaseous stream comprising a majority of $N_2$, $O_2$, and/or Ar and a liquid stream comprising a majority of $CO_2$; a stripping distillation column receives the liquid stream comprising a majority of $CO_2$ from the phase separator, the stripping column being adapted and configured to separate the contents of the liquid stream comprising a majority of $CO_2$ into a gaseous stream and a liquid $CO_2$ product stream.
- a compressor and a drying unit are adapted and configured to compress and dry the source fluid, wherein the heat exchanger is also adapted and configured to at least partially condense the compressed and dried source fluid prior to being fed to the rectifying column.
- the fluid source is a boiler adapted and configured to produce flue gas and the flue gas is the fluid comprising $NO_2$ and $CO_2$.
- the compressor also receives the gaseous stream from the stripping column.
- a compressor and heater compresses and heats the wholly gaseous $CO_2$ product stream to provide a supercritical product $CO_2$ stream.
- the membrane also receives the sweep gas on a permeate side of the membrane.
- a wash column receives the gaseous permeate stream and dissolves at least some of the $NO_2$ present in gaseous permeate stream to form nitric acid.
- the membrane includes a separation layer comprising a material selected from the group consisting of: a cross-linked polysiloxane copolyether, polyurethane-polyether block copolymer, a poly(urea)-poly(ether) block copolymer, a poly(ester)-poly(ether) block copolymer, and a poly(amide)-poly(ether) block copolymer.

DETAILED DESCRIPTION OF THE INVENTION

The invention will now be described in further detail with reference to the figures.

Figure 1:
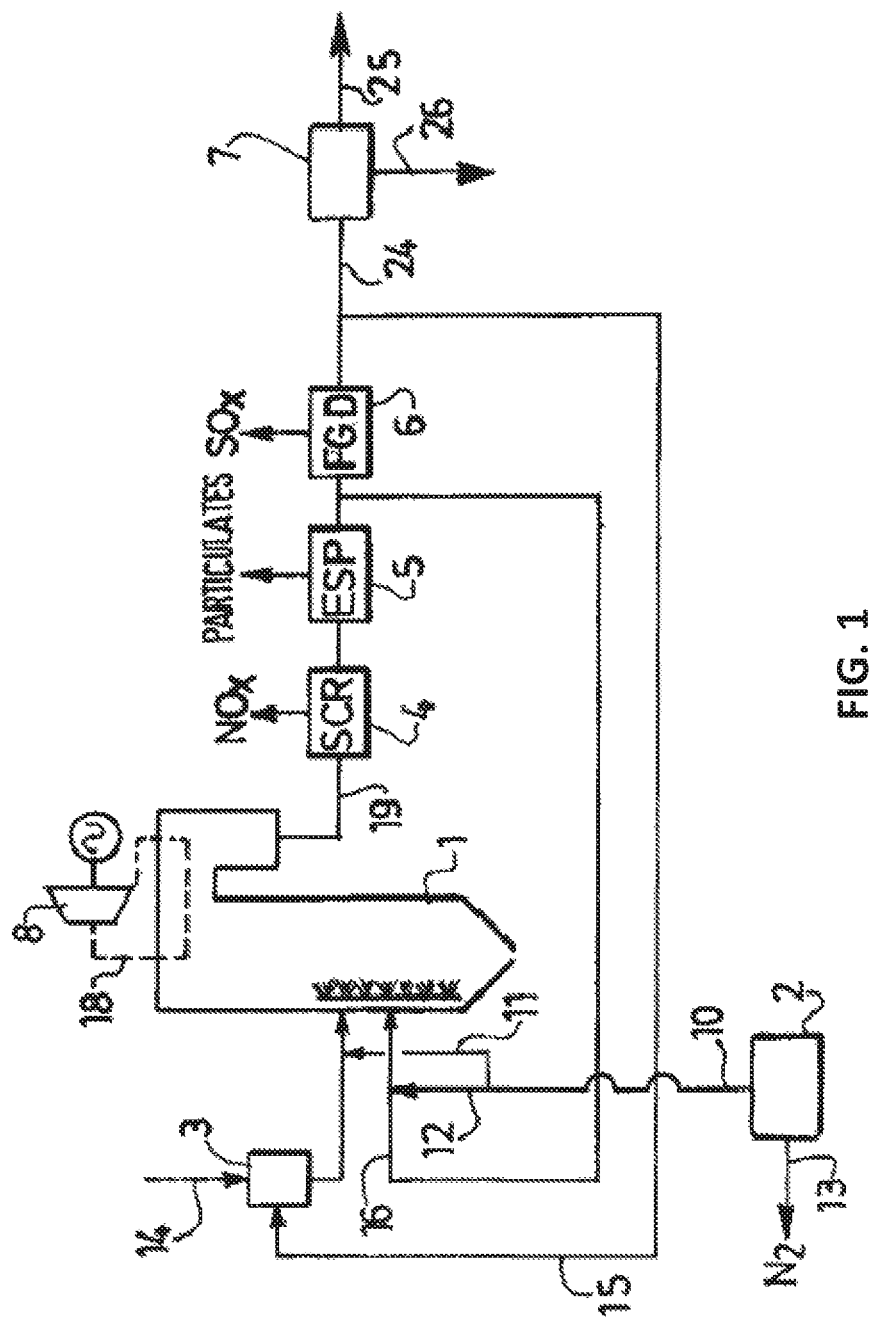
FIG. 1 is a schematic view of an oxycombustion plant.

FIG. 1 is a schematic view of an oxycombustion plant. Air separation unit 2 produces an oxygen stream 10 at a typical purity of 95-98 mol. % and a waste nitrogen stream 13. Oxygen stream 10 is split into two sub streams 11 and 12. The primary flue gas recycle stream 15 passes through coal mills 3 where coal 14 is pulverized. Substream 11 is mixed with the recycle stream downstream of the coal mills 3 and the mixture is introduced in the burners of the boiler 1. Sub stream 12 is mixed with secondary flue gas recycle stream 16 which provides the additional ballast to the burners to maintain temperatures within the furnace at acceptable levels. Water stream(s) is introduced in the boiler 1 in order to produce steam stream(s) 18 which is expanded in steam turbine 8.

One of ordinary skill in the art will recognize that the flue gas to be treated according to the invention may instead be derived from any of well-known oxy-combustion schemes differing from the one illustrated in FIG. 1.

Flue gas stream 19 rich in $CO_2$, typically containing more than 70 mol. % on a dry basis, goes through several treatments to remove some impurities. Unit 4 is NOx removing system such as a selective catalyst reduction unit (SCR). Unit 5 is a dust removal system such as electrostatic precipitator and/or baghouse filters. Unit 6 is a desulfurization system adapted and configured to remove $SO_2$ and/or $SO_3$. Units 4 and 6 may not be necessary depending on the $CO_2$ product specification. Flue gas stream 24 is then introduced in a compression and purification unit 7 in order to produce a high $CO_2$ purity stream 25 suitable for transport, injection into a pipeline, use in enhanced oil recovery, and/or sequestration in a geologic formation. Unit 7 also produces a waste stream 26.

While the flue gas of FIG. 1 is derived from oxy-combustion, one of ordinary skill in the art will recognize that a lowered NOx $CO_2$ product may also be produced from flue gas derived from air-fired combustion or oxygen-enriched combustion.

Figure 2:
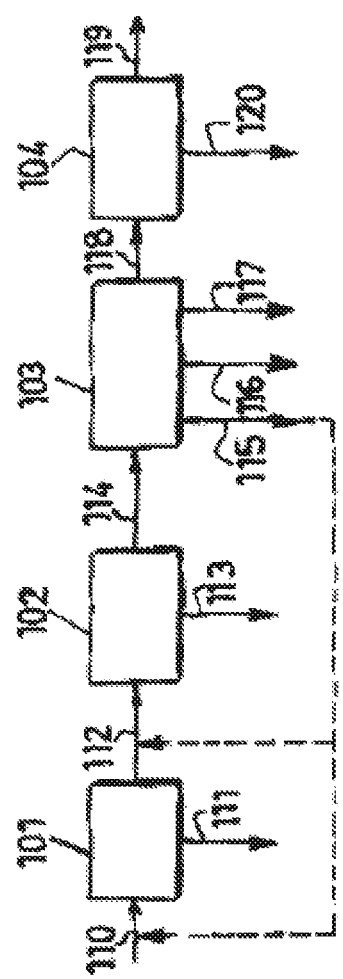
FIG. 2 is a schematic view of a compression and purification unit.

FIG. 2 is a schematic view of a compression and purification unit which could be used as unit 7 in FIG. 1. Flue gas stream 110 (corresponding to stream 24 of FIG. 1) enters a low pressure pretreatment unit 101 where it is prepared for compression unit 102. This unit could include, for example, among other steps:
  a dust removal step in a wet scrubber and/or a dry process either dynamic, such as pulse-jet cartridges or static, such as pockets and cartridges;
  a (further) desulfurization step in a wet scrubber with water and/or soda ash or caustic soda injection; and
  a cooling step in order to minimize the flow through water condensation and the power of compression unit both due to flow and temperature reduction.

Waste stream(s) 111 could include condensed water, dust and dissolved species like $H_2SO_4$, $HNO_3$, $Na_2SO_4$, $CaSO_4$, $Na_2CO_3$, and $CaCO$.

Compression unit 102 compresses stream 112 from a pressure close to atmospheric pressure to a high pressure typically between 15 and 60 bar abs, preferably around 30 bar abs. This compression could be done in several stages with intermediate cooling. In this case, some condensate(s) 113 could be produced. Such condensate(s) 113 typically includes $HNO_3$ formed from reaction of $NO_2$ and water. Heat of compression may be usefully recovered in the intermediate cooling step, for example, in preheating boiler feed water. Hot stream 114 leaves the compression unit 102 and enters a high pressure pretreatment unit 103.

The high pressure pretreatment unit 103 includes at least:
  one or several cooling step(s) in order to decrease the temperature and decrease the water content; and
  a drying step to remove most of the water, for example by adsorption.
The high pressure pretreatment unit 103 could also include, but is not limited to:
  a high pressure washing column for cooling and/or purification; and
  a mercury removal step.
Effluents from unit 103 include gaseous stream 115 (the regeneration stream of the drying step) and may include liquid stream(s) 116/117 (from the cooling step and/or the high pressure washing column).

The stream 114 may contain $NO_2$. In this case, it is sometimes preferable to remove the $NO_2$ by adsorption upstream of the unit 104. In this case, the stream 114 may be treated by adsorption and the regeneration gas used to regenerate the adsorbent is removed having a content enriched in $NO_2$ with respect to that of stream 114. The gaseous stream 115 may optionally be recycled at least in part upstream of the compression unit 102, upstream of the pretreatment unit 101 or to the boiler 1 of the combustion unit.

Unit 104 is a low temperature purification unit. In this case, low temperature means a minimum temperature in the process cycle for the purification of the flue gas below 0° C. and preferably below −20° C. as close as possible to the triple point temperature of pure $CO_2$ at −56.6° C. In this unit, stream 118 is cooled down and partially condensed in one (or several steps). One (or several) liquid phase stream(s) enriched in $CO_2$ is (are) recovered, expanded and vaporized in order to have a product enriched in $CO_2$ 119. Such gaseous CO2 product may be used on-site. Alternatively, the recovered liquid phase stream(s) enriched in $CO_2$ may be maintained in liquid form and the pressure and temperature adjusted according to known techniques to provide a liquid product $CO_2$ stream suitable for storage, on-site consumption, or transport by tube trailer. As another alternative, the pressure and temperature of the recovered liquid phase stream(s) enriched in $CO_2$ may be adjusted according to known techniques to provide a supercritical product $CO_2$ stream suitable for injection into a pipeline or sequestered in a geologic formation. One (or several) incondensible high pressure stream(s) 120 is (are) recovered and could be expanded in an expander.

Unit 104 includes a rectifying distillation column that separates a $NO_2$ and $CO_2$-containing feed fluid into a $CO_2$-enriched gaseous stream and a $NO_2$-enriched liquid stream (relative to the concentrations of $NO_2$ and $CO_2$ in the feed fluid). The feed fluid can consist of stream 118 or may be derived from stream 118 after further treatment of stream 118.

Unit 104 also includes a fluid separation membrane (operated under pervaporative conditions) that separates the $NO_2$-enriched liquid stream from the rectifying column into a $NO_2$-enriched gaseous permeate stream and a liquid non-permeate stream. The liquid non-permeate stream is recycled to the rectifying column.

Unit 104 also includes phase separator that expands the $CO_2$-enriched gaseous stream from the rectifying column and separates it into a gaseous stream (for eventual venting) and a liquid stream for feeding to a stripping distillation column (which also receives a stripping fluid derived from vaporization of at least a portion of the liquid non-permeate stream). The distillation column strips the incondensable components ($O_2$, $N_2$, and Ar) from the combined contents of the stripping fluid and the liquid stream (from the phase separator) into a gaseous stream and the liquid phase stream(s) enriched in $CO_2$. The gaseous stream from the stripping column may be combined with the feed fluid fed to the rectifying column.

$CO_2$ enriched product 119 may be further treated to provide it in whichever forms (gaseous, liquid, supercritical, solid) and pressure/temperature desired. In the case of sequestration, CO2 enriched product 119 may be further compressed condensed and then further compressed with a pump in order to be delivered at high pressure (typically 100 to 200 bar abs) for injection into a pipeline leading to the sequestration site.

Figure 3:
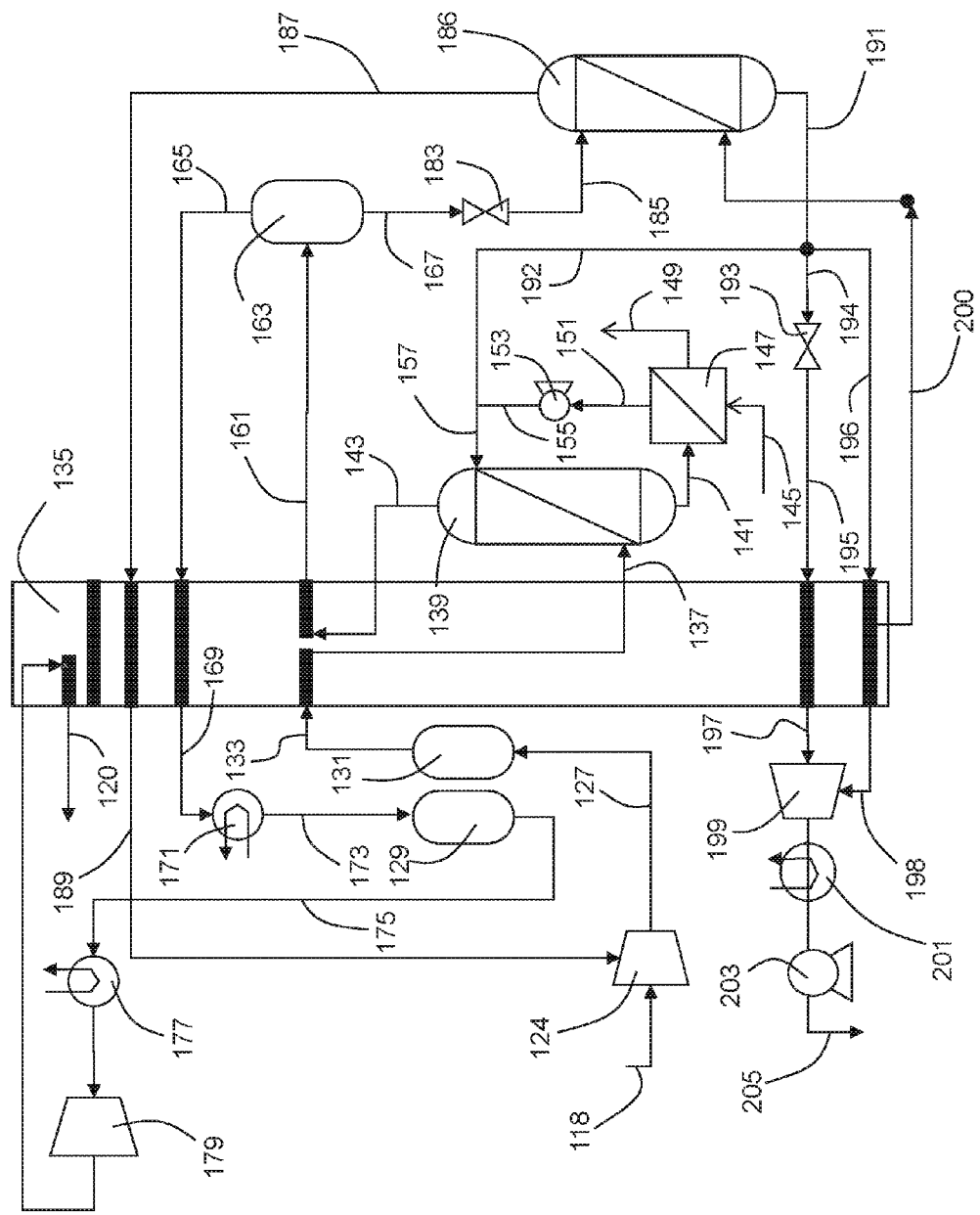
FIG. 3 shows a low temperature purification unit.

FIG. 3 shows a low temperature purification unit that could be used as unit 104 in FIG. 2. At least one process according to the invention operates within such a unit.

Stream 118 comprising flue gas at around 30 bar and at a temperature of between 15° C. and 43° C. contains mainly carbon dioxide but also includes lesser amounts of $NO_2$, oxygen, argon and nitrogen. The actual amount of NOx will vary over time depending upon how much NOx has already been adsorbed in the driers. Typically, the inlet NOx will vary between 0 ppm and 500 ppm. The actual amount of NOx will also depend upon the type of burner producing the flue gas. Stream 118 may be produced by unit 103 already at the desired pressure conditions or it may be brought up to the desired pressure level using optional compressor 124. Compressed flue gas stream 127 is alternatingly directed to one of two driers 129, 131. While one of the driers 129, 131 is being operated to dry stream 127, the other of the driers is regenerated.

Dried, compressed flue gas stream 133 is cooled and at least partially condensed at multi-fluid heat exchanger 135.

The liquid or biphasic flue gas stream 137 is fed to rectifying (also known as De-NOx) column 139 as reflux and separated into a $NO_2$-enriched liquid stream 141 and a $CO_2$-enriched gaseous stream 143. The pressure in the De NOx column is typically about 25 bar abs where the inlet gas temperature is about −19° C.

The $NO_2$-enriched liquid stream 141 is fed to a feed gas side of a pervaporative separation membrane 147. The membrane 147 includes a separation layer that is comprised of a material that selectively permeates $NO_2$ (and $SO_2$, if present) over $CO_2$ so as to provide a $NO_2$-enriched permeate and a $CO_2$-enriched non-permeate. An optional sweep gas 145 fed to a permeation side (opposite that of the feed gas side) of membrane 147 will enhance permeation of the $NO_2$ from stream 141 across the membrane 147 from the feed gas side to the permeation side by lowering its partial pressure on the permeate side. The combined sweep gas 145 and $NO_2$-enriched permeate is withdrawn from membrane 147 as stream 149.

The $CO_2$-enriched non-permeate withdrawn from membrane 147 as liquid stream 151 is pressurized with pump 153. The pressurized liquid stream 155 is combined with stream 192 and recycled back to rectifying column 139.

Gaseous stream 143, containing between about 1-5 ppm $NO_2$ and about 98% $CO_2$, is cooled and at least partially condensed at heat exchanger 135 to provide a cool biphasic stream 161. Biphasic stream 161 is then fed to a phase separator 163 to provide a $N_2$, $O_2$, and Ar-enriched gaseous stream 165 and a $CO_2$-enriched liquid stream 167.

Stream 165 is warmed at heat exchanger 135 and the warmed stream 169 further warmed at heater or heat exchanger 171. Twice-warmed stream 171 is used to regenerate the drier 129, 131 being operated in regeneration mode and then subsequently warmed at heat exchanger 177 in order enhance the available expansion energy recovered at expander 179. Downstream of expander 179, it is warmed at heat exchanger 135 and the warmed, expanded stream 120 vented.

The pressure of the $CO_2$-enriched liquid stream 167 is decreased at expansion valve and fed as reflux to stripping column 186. Column 186, under a pressure around 15 bar and a temperature between −27° C. and −50° C., operates to remove the incondensible components ($N_2$, $O_2$, and Ar) in the form of a $CO_2$-depleted gaseous stream 187 from the top of column 186. Some of the cold energy of stream 187 is recovered at heat exchanger 135, thereby providing warmed stream 189 which is combined with flue gas stream 118 at the suction inlet of compressor 124.

A carbon dioxide liquid stream 191 is also removed from the bottom of column 186 and split into stream 192, stream 194, and stream 196. Stream 192 is combined with the liquid non-permeate stream 155 to provide stream 157 which is fed to the rectifying column 139. The pressure of stream 194 is reduced at expansion valve 193 to provide a cooler, biphasic (liquid/gaseous $CO_2$) stream 195. Latent heat in stream 195 is recovered at heat exchanger 135 through vaporization of the remaining liquid phase of biphasic stream 195 to provide gaseous stream 197.

The $CO_2$ in stream 196 is warmed in two portions at heat exchanger 135 to different degrees. Resultant stream 198 is superheated while stream 200 remains at its dewpoint and is fed to stripping column 186 for providing the necessary heat to the column.

Stream 197 and stream 198 are then combined at the suction inlet of compressor 199, compressed at compressor 199 and cooled at heat exchanger 201 to a level above the critical pressure of $CO_2$. The pressure of the heated, compressed stream is then raised above the critical pressure of $CO_2$ to provide supercritical $CO_2$-enriched product stream 119 useful for injection into a pipeline.

One of ordinary skill in the art will recognize that the $CO_2$-enriched product 119 may instead be provided in liquid form for storage, on-site consumption, and/or transport by tube trailer. Also, the liquid $CO_2$ stream 191 need not be fed to expansion valve 193 or passed through heat exchanger 135. Indeed, the pressure and/or temperature of liquid $CO_2$ stream 191 may be adjusted according to techniques well-known in the art to provide any desired pressure and temperature for a liquid $CO_2$-enriched product 119.

The membrane 147 includes a perm-selective separation layer that is primarily responsible for the separation of $NO_2$ (along with $SO_2$ if present) and $CO_2$. The membrane 147 may be made entirely of the polymeric material of the separation layer. The membrane 147 may instead have a composite structure where the separation layer is supported by a support layer whose purpose is to provide mechanical strength. The material of the support layer may be any material known to those skilled in the art of fluid membrane separation as having relatively high flux and sufficiently desirable mechanical strength. The membrane 147 may have any configuration known to those skilled in the art of fluid separation membranes, including spirally-wound sheets and hollow fibers.

The membrane 147 operates on a solubility selectivity principle. Solubility is usually correlated with molecular parameters such as the Lennard-Jones affinity constant or the critical temperature. Since the critical temperatures of $NO_2$ and $SO_2$ are above 157° C. and the critical temperature of $CO_2$ is only 30.98° C., we believe that $NO_2$ and $SO_2$ are expected to exhibit high permeability through polymers with flexible main chains and having polar affinity.

Several polymeric materials are suitable for use in the separation layer of the membrane 147, including polysiloxane copolyethers (which are cross-linked), polyurethane-polyether block copolymers, poly(urea)-poly(ether) block copolymers, poly(ester)-poly(ether) block copolymers, and poly(amide)-poly(ether) block copolymers.

In the case of a cross-linked polysiloxane copolyether, it comprises polysiloxane copolyether comprises a polymeric chain comprising repeating units of the molecular segment of formula (1), a terminal molecular segment —O—W bonded to a silicon atom of one end of the chain where O is an oxygen atom, and a terminal molecular segment —W bonded to an oxygen atom of the other end of the chain:

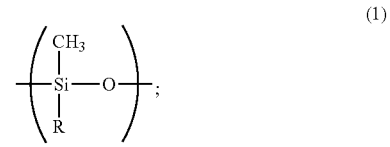

(1)

Each W is selected from the group consisting of a —Si(CH$_3$)$_3$ group, the molecular segment of formula (2), the molecular segment of formula (3), and the molecular segment of formula (4);

$$—(CH_2)_p—X—OH \qquad (2)$$

$$—(CH_2)_p—NH—(CH_2)_q—NH_2 \qquad (3)$$

$$—(CH_2)_p—X—O—\overset{\overset{O}{\|}}{C}—CH=CH_2; \qquad (4)$$

Each X comprises b repeating units of the molecular segment of formula (5) and c repeating units of the molecular segment of formula (6):

$$—(O—CH_2—CH_2)— \qquad (5)$$

$$—(O—CH_2—\overset{\overset{CH_3}{|}}{CH})—; \qquad (6)$$

Each R is individually selected from the group consisting of a phenyl group, a C$_1$-C$_6$ alkyl group, the molecular segment of formula (2), the molecular segment of formula (3), and the molecular segment of formula (4);

In order to ensure the presence of a polyether content in the polysiloxane copolyether, the following two conditions apply. First, if each W is a —Si(CH$_3$)$_3$ group or the molecular segment of formula (3), then at least some R's are the molecular segment of formula (2) or the molecular segment of formula (4). Second, if each R is either a phenyl group or a C$_1$-C$_6$ alkyl group, then each W is either the molecular segment of formula (2) or the molecular segment of formula (4).

The following integers have the following ranges:
p: 1-3;
q: 1-3;
b: 0-400;
c: 0-200.

The number of repeating units where R is a C$_1$-C$_6$ alkyl group is 1-2000.

The ratio of polyether segments to polysiloxane segments may vary. When W is —Si(CH$_3$)$_3$ group, cross-linking sites are present in the middle of the chain and the ratio of the number of molecular segments that are of either formulae (5) or (6) to the number of silicon atoms in the chain ranges from about 0.05 to about 6.0. When each R is either a phenyl group or a C$_1$-C$_6$ alkyl group, cross-linking sites are present at each end of the chain and the ratio of the number of molecular segments that are of either formulae (5) or (6) to the number of silicon atoms in the chain ranges from about 0.05 to about 0.33. In this case, a greater content of siloxane-based repeating units is desired for providing greater robustness.

A potential cross-linking site may be wherever either W or R is the molecular segment of formulae (2), (3), or (4). The type of linkage formed at the cross-linked site will depend upon the W or R in question and the type of cross-linking agent or cross-linking promoter. For W's and R's of the molecular segment of formula (2), a urethane linkage may be formed using a monomeric diisocyanate, a monomeric triisocyanate or polymeric isocyanate cross-linking agent. For W's and R's of the molecular segment of formula (3), a urea linkage may be formed using a monomeric diisocyanate, a monomeric triisocyanate or polymeric isocyanate cross-linking agent. For W's and R's of the molecular segment of formula (3), an amide linkage may instead be formed using a di-acyl chloride substituted aromatic cross-linking agent, or a tri-acyl chloride substituted aromatic cross-linking agent. For W's and R's of the molecular segment of formula (4), the copolymer may be cross-linked using a free radical cross-linking promoter, such as an azo or peroxide free radical initiator.

Non-limiting examples of suitable monomeric diisocyanate, monomeric triisocyanate or polymeric isocyanate cross-linking agents are toluene diisocyanate (TDI) commercially available from a wide variety of sources or cyanate-functionalized siloxanes commercially available from Siltech. Non-limiting examples of suitable di-acyl chloride substituted aromatic cross-linking agents and tri-acyl chloride substituted aromatic cross-linking agents include 1,3-benzenedicarbonyl dichloride, 1,4-benzenedicarbonyl dichloride, and 1,3,5-benzenetricarbonyl trichloride.

The cross-linked polysiloxane copolyether may optionally be cross-linked together with one or more silicone elastomers. The silicone elastomer may be derived from a first silicone polymer having a first reactive functional group (such as a vinylsiloxane unit) and a crosslinking agent having a second reactive functional group (such as a hydrogensiloxane unit). Suitable silicone elastomers may be commercially obtained from Momentive under trade name RTV615 and from Dow Corning under trade name Sylgard 184, 182, or 186.

Particularly suitable types of polysiloxane copolyethers may be commercially obtained from Siltech under the trade names D-208, Di-2510, Di-5018F, Di1010, and J-1015-O.

The polyurethane-polyether block copolymers are produced by reacting at least one polyether glycol with either an aromatic or aliphatic diisocyanate followed by reaction with at least one aliphatic diol (to form a polyurethane-polyether) or with a at least one aliphatic diamine (to form a polyurea-polyether) in the presence of a catalyst, such as organotin compounds, such as dibutyltindilaurate, but other catalysts known to one skilled in the art may be used. The resulting polymers contain the soft segments of formula (I$_s$) comprising polyether and the hard segments of formula (I$_h$) comprising polyurethane or polyurea.

The resultant polyurethane-polyether or polyurea-polyether block copolymers are represented by the repeating units of formulas (I$_s$) and (I$_h$):

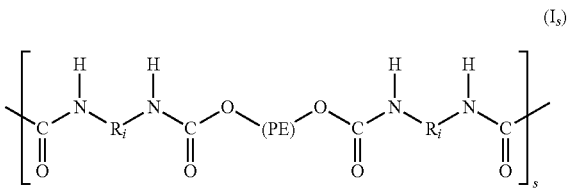

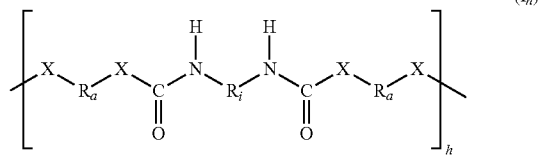

$R_i$ of formulas ($I_s$) and ($I_h$) is an aliphatic or aromatic radical of at least about 2-18 carbon atoms. (PE) is a polyether segment having a number average molecular weight, $M_n$ (which is essentially equivalent to $M_n$ of the repeating formula ($I_a$)), ranging from about 600 to 8000, and preferably about 1000 to 4000. $R_a$ of ($I_h$) is a linear or branched aliphatic radical of at least about 2-18 carbon atoms; and, X is an oxygen atom or —NH—. If X is oxygen, the block copolymer is a polyurethane-polyether, and if X is —NH—, the block copolymer is a polyurea-polyether. Within the block copolymer, the number of carbon atoms in the repeating units may vary and there may be varieties and combinations of numbers of carbon atoms therein. The number average molecular weight of the repeating formula ($I_h$) is preferably in the range of about 200 to 3000, and more preferably about 200-1000. In one copolymer in particular, Ri is linear —$(CH_2)_6$—, or a moiety of composition selected from the group primarily comprising formula (S), formula (T), formula (U), or (V) below, and a combination or mixtures thereof.

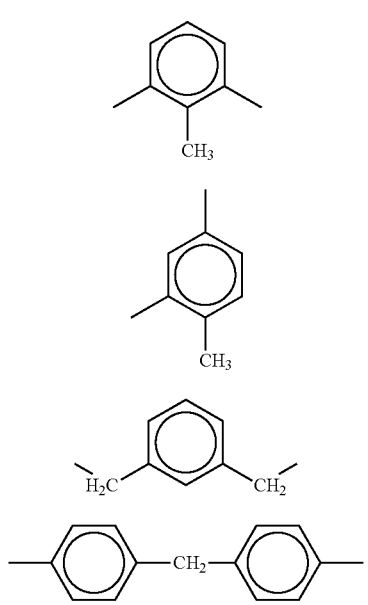

(S)

(T)

(U)

(V)

These structures correspond to 1,6-hexanediisocyanate, tolylene-2,6-diisocyanate, tolylene-2,4-diisocyanate, 1,3-xylylenediisocyanate, and 4,4'-methylenebis (phenylisocyanate), respectively. The polyether segment, (PE), is derived preferably from a polyether glycol of number average molecular weight of about 600-8000, and more preferably about 1000-4000, and preferably an oxygen/carbon ratio of about 0.2-0.5. Preferred polyether glycols are hydroxyl terminated polyethylene glycol, hydroxyl terminated 1,2-polypropylene glycol, and hydroxyl terminated 1,4-polybutylene glycol, although other glycols known or used by one skilled in the art may be used.

The hard segment of the polyurethane-polyether or polyurea-polyether block copolymer is derived from the reaction of residual aliphatic or aromatic diisocyanate end groups or monomer with either at least one aliphatic diol or at least one aliphatic diamine. Preferred diols or diamines contain at least about 2-18 carbon atoms and can be linear or branched. Most preferred are diols or diamines containing at least about 2-6 carbon atoms. Typical diols and diamines are ethylene glycol, 1,3-propanediol, 1,2-propanediol, 1,4-butanediol, 1,6-hexanediol, 1,2-diaminoethane, 1,4-diaminobutane, 1,5-diaminopentane, 1,5-diaminohexane, 1,6-diaminohexane, and dl-serine (3-amino-2-hydroxypropionic acid), although other diols and diamines known or used by one skilled in the art may be used. Typically, the polyurethane-polyether or polyurea-polyether block copolymers exhibit a number average molecular weight in the range from about 23,000 to 400,000 and preferably about 50,000-280,000. As shown from the variety of combinations of components, a wide range and variety of types of polyurethane-polyether and polyurea-polyether block copolymers are contemplated and disclosed herein. Typically, the soft segment comprises about 50-90 weight percent of the block copolymer weight, and more typically, about 60-85 percent.

The polyester-polyether block copolymers are produced by reacting at least one hydroxyl terminated polyether glycol, an excess of at least one aliphatic diol, and at least one dicarboxylic ester of an aromatic or aliphatic diacid in the presence of a catalyst. The resulting polymers contain the soft segments of formula ($II_s$) comprising polyether and the hard segments of formula ($II_h$) comprising polyester:

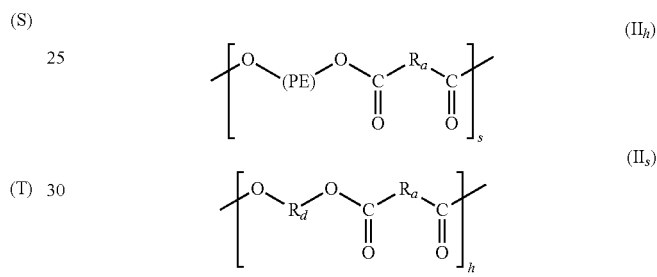

($II_h$)

($II_s$)

$R_a$ of ($II_s$) and ($II_h$) is an aliphatic or aromatic radical of about at least 2-18 carbon atoms. (PE) of ($II_s$) is a polyether segment having a number average molecular weight, $M_n$ (which is essentially equivalent to $M_n$ of the repeating formula ($II_s$)), ranging from about 600 to 8000, and preferably about 1000 to 4000. $R_d$ of ($II_h$) is at least one linear or branched aliphatic radical of about at least 2-18 carbon atoms. Within the polyester-polyether block copolymer, the number of carbon atoms in the repeating units may vary and there may be varieties and combinations of numbers of carbon atoms therein. The average molecular weight of the repeating formula ($II_h$) is preferably in the range of about 200 to 3000, and more preferably about 200-1000. In a preferred embodiment of the invention, $R_a$ is a moiety of composition selected from the group consisting or comprising formulas (S), (T), (U), (V), (W), (X), or (Y) below, or a combination or mixture thereof:

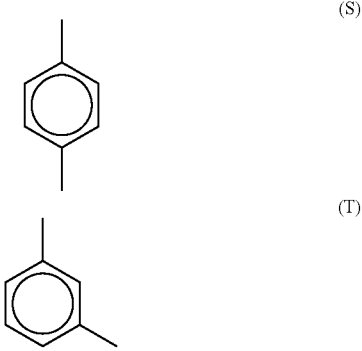

(S)

(T)

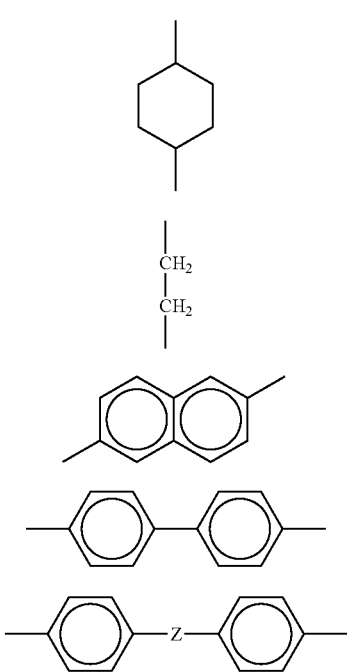

(U)

(V)

(W)

(X)

(Y)

Further, where formula (Y) is present or included, the —Z— in formula (Y) is a moiety selected from the group comprising or consisting of formulas (A), (B), (C), or (D), below, or a mixture or combination thereof:

—CH$_2$—    (A)

—O—    (B)

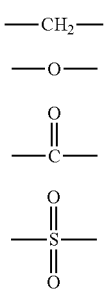

(C)

(D)

The polyether segment, (PE), of the polyester-polyether block copolymer is derived preferably from a polyether glycol of number average molecular weight of about 600-8000, and more preferably about 1000-4000, and preferably an oxygen/carbon ratio of about 0.2-0.5. Preferred polyether glycols are hydroxyl terminated polyethylene glycol, hydroxyl terminated 1,2-polypropylene glycol, and hydroxyl terminated 1,4-polybutylene glycol, although other glycols known or used by one skilled in the art may be used. The hard segment of the block copolymer is derived from the condensation polymerization of at least one ester of an aromatic or aliphatic diacid with at least one aliphatic diol. The moiety R d of formula (I h) is a derivative of the aliphatic diol. Preferred diols contain at least about 2-18 carbon atoms and can be linear and/or branched. Most preferred are diols containing between about 2-6 carbon atoms. Typical diols are ethylene glycol, 1,3-propanediol, 1,2-propanediol, 1,4-butanediol, and 1,6-hexanediol, although other diols known or used by one skilled in the art may be used. Typically, the polymers of this invention exhibit a number average molecular weight in the range from about 23,000 to 400,000 and preferably about 50,000-280,000. As shown from the variety of combinations of components, a variety of types of polyester-polyether block copolymers are contemplated and disclosed herein.

Typically, the soft segment of the polyester-polyether block copolymer comprises about 50-90 weight percent of the copolymer weight, and more typically, about 60-85 percent.

The polyamide-polyether block copolymers comprise repeating units of the moiety of formula III:

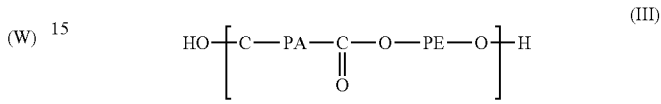

(III)

where PA is a saturated aliphatic polyamide segment and PE is a polyether segment. Typically, the saturated aliphatic polyamide segment is either:

Nylon 6 (PA6) which is poly[imino(1-oxohexamethylene)], or

Nylon 12 (PA12) which is poly[imino(1-oxododecamethylene)].

Typically, the polyether segment is either:

PEO which is poly(ethylene oxide), or

PTMEO which poly(tetramethylene oxide).

One particularly suitable group of polyamide-polyether block copolymers is commercially available from Arkema under the tradename PEBAX. These are obtained by polycondensation of a carboxylic acid polyamide (PA6, PA11, PA12) with an alcohol terminated polyether such as poly (tetramethyleneglycol) (PTMG) or polyethyleneglycol (PEG).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. An apparatus for separating $NO_2$ from a $CO_2$ and $NO_2$-containing fluid, comprising:
   a source of a fluid comprising $NO_2$ and $CO_2$;
   a rectifying distillation column receiving the source fluid;
   a fluid separation membrane that receives a liquid stream from the rectifying column and yields a liquid non-permeate stream and a gaseous permeate stream; and
   a pump feeding, to the rectifying column, the non-permeate liquid from the membrane.

2. The apparatus of claim 1, further comprising:
   a heat exchanger at least partially condensing a gaseous stream from the rectifying column;
   a phase separator receiving the at least partially condensed stream from the heat exchanger and producing a gaseous stream comprising a majority of $N_2$, $O_2$, and/or Ar and a liquid stream comprising a majority of $CO_2$;
   a stripping distillation column receiving the liquid stream comprising a majority of CO2 from the phase separator, the stripping column being adapted and configured to separate the contents of the liquid stream comprising a majority of $CO_2$ into a gaseous stream and a liquid $CO_2$ product stream.

3. The apparatus of claim 2, further comprising a compressor and a drying unit adapted and configured to compress and dry the source fluid, wherein the heat exchanger is also adapted and configured to at least partially condense the compressed and dried source fluid prior to being fed to the rectifying column.

4. The apparatus of claim 3, wherein the fluid source is a boiler adapted and configured to produce flue gas and the flue gas is the fluid comprising $NO_2$ and $CO_2$.

5. The apparatus of claim 3, wherein the compressor also receives the gaseous stream from the stripping column.

6. The apparatus of claim 3, further comprising a compressor and heater that compress and heats the wholly gaseous $CO_2$ product stream to provide a supercritical product $CO_2$ stream.

7. The process of claim 1, further comprising a source of a sweep gas, the membrane also receiving the sweep gas on a permeate side of the membrane.

8. The apparatus of claim 1, further comprising a wash column receiving the gaseous permeate stream and dissolving at least some of the $NO_2$ present in gaseous permeate stream to form nitric acid.

9. The apparatus of claim 1, wherein the membrane includes a separation layer comprising a material selected from the group consisting of: a cross-linked polysiloxane copolyether, polyurethane-polyether block copolymer, a poly(urea)-poly(ether) block copolymer, a poly(ester)-poly(ether) block copolymer, and a poly(amide)-poly(ether) block copolymer.

* * * * *